United States Patent [19]

Hastings

[11] Patent Number: 5,705,903
[45] Date of Patent: Jan. 6, 1998

[54] ELECTRIC BRAKE FOR AN ALTERNATING CURRENT MOTOR

[75] Inventor: Mark E. Hastings, Mukilteo, Wash.

[73] Assignee: Unicoil, Inc., Norcross, Ga.

[21] Appl. No.: 599,722

[22] Filed: Feb. 12, 1996

[51] Int. Cl.$^6$ .................................................. H02P 3/08
[52] U.S. Cl. .......................... 318/370; 318/375; 318/373; 318/380
[58] Field of Search ............................. 318/138, 139, 318/245, 254, 256, 258, 260, 370–385, 700–832

[56] References Cited

U.S. PATENT DOCUMENTS

| | | |
|---|---|---|
| 2,445,806 | 7/1948 | Snyder . |
| 2,677,087 | 4/1954 | Willmott . |
| 3,476,699 | 11/1969 | Oltendorf . |
| 3,541,411 | 11/1970 | Sharp . |
| 3,593,085 | 7/1971 | Decker . |
| 3,628,112 | 12/1971 | Gross ................................ 318/258 |
| 3,697,845 | 10/1972 | Soffer et al. ..................... 318/380 |
| 3,732,475 | 5/1973 | Geerling .......................... 318/275 |
| 3,798,523 | 3/1974 | Gross . |
| 3,811,080 | 5/1974 | Morton et al. .................. 318/380 |
| 3,872,363 | 3/1975 | Gross ................................ 318/377 |
| 3,903,464 | 9/1975 | Lyon et al. . |
| 4,095,151 | 6/1978 | Mourick ........................... 318/266 |
| 4,166,240 | 8/1979 | Russell ............................ 318/380 |
| 4,195,255 | 3/1980 | Guttmann . |
| 4,271,383 | 6/1981 | Endo ................................ 318/375 |
| 4,330,742 | 5/1982 | Reimers ............................ 320/14 |
| 4,395,670 | 7/1983 | Podell . |
| 4,422,021 | 12/1983 | Schwarz ........................... 318/376 |
| 4,514,677 | 4/1985 | Kaufman, III et al. . |
| 4,524,312 | 6/1985 | Matsumoto et al. ............ 318/481 |
| 4,547,692 | 10/1985 | Spaulding . |
| 4,555,652 | 11/1985 | Brulard ............................ 318/375 |
| 4,556,831 | 12/1985 | Sakamoto et al. .............. 318/434 |
| 4,922,161 | 5/1990 | Gilliland et al. ................ 318/269 |
| 5,132,598 | 7/1992 | Albanesius et al. ............. 318/285 |
| 5,208,741 | 5/1993 | Kumar ............................. 363/124 |
| 5,278,484 | 1/1994 | Hakala . |
| 5,294,874 | 3/1994 | Hessenberger et al. ........ 318/759 |
| 5,350,985 | 9/1994 | Konrad et al. .................. 318/370 |
| 5,420,491 | 5/1995 | Kanzaki et al. ................ 318/727 |

Primary Examiner—Paul Ip
Attorney, Agent, or Firm—Christensen O'Connor Johnson & Kindness PLLC

[57] ABSTRACT

An electric brake circuit (10) for bringing an alternating current (AC) motor (12) to a rapid halt. When the AC motor is turned on, a braking capacitor (C1) is charged to a preselected voltage. A shunt regulator (18) prevents the braking capacitor from overcharging by shunting charging current to ground once the braking capacitor reaches the preselected voltage. In a preferred embodiment, a limit circuit (20) turns off the charging current on the subsequent positive phase of the AC line voltage powering the electric brake. By shutting off current flow to the circuit when the preselected voltage on the capacitor is reached, power consumption and size of the circuit are minimized.

21 Claims, 1 Drawing Sheet

ELECTRIC BRAKE FOR AN ALTERNATING CURRENT MOTOR

FIELD OF THE INVENTION

The invention relates generally to motor control circuits, and in particular, to a brake circuit for an alternating current motor.

BACKGROUND OF THE INVENTION

Alternating current (AC) motors used in light industrial applications are typically synchronous motors having a starting winding and a running winding. The starting winding includes a starting capacitor or other capacitive component in series with the winding to shift the phase of the voltage and current applied to the starting winding with respect to the voltage and current applied to the running winding. The phase difference between the starting winding current and the running winding current produces a sufficiently strong starting torque to start the rotation of the rotor in the correct direction. When the motor achieves an operating speed, the motor operates in large part on the running winding.

In most applications it is desirable to bring an AC motor to a rapid and controlled stop. One technique known in the art to stop an AC motor is to apply a direct current (DC) across the windings of the motor. The application of direct current to the windings generates an electromagnetic force within the motor to stop the rotor with a rapid braking action. The speed with which the motor is brought to a stop is dependent upon the inertia of the motor's rotor, and the inertia of any device that is connected to the motor. By appropriately selecting the magnitude of the direct current applied to the winding, the motor can be halted within an acceptable period of time.

In prior art braking systems, it has been recognized that the starting capacitor in the AC motor may be charged during operation of the motor and then electrically coupled to the windings of the AC motor to produce a braking force on the motor when the motor is switched off. In practice, however, it has been found that the braking effect afforded by the starting capacitor often does not stop the motor within the desired time due to the limited charge the starting capacitor can store. To enhance the braking effect, several prior art systems therefore add a braking capacitor having a greater storage capacity to the braking circuit. During motor operation, the braking capacitor is charged. When the motor is to be stopped, the braking capacitor is applied across the windings of the motor to bring the motor to a rapid halt.

An example of a system using a braking capacitor to rapidly brake an AC motor is disclosed in U.S. Pat. No. 2,445,806 to Snyder. In Snyder, a large capacitor is charged by application of a rectified line voltage across the capacitor. A resistor operates as a voltage divider to limit the amount of voltage applied to the capacitor. When the motor is to be stopped, the line voltage is removed and the capacitor applied across the running winding of the motor. By appropriately selecting the size of the capacitor, the charge stored within the capacitor is sufficient to generate a braking field to stop the motor.

A similar braking system is shown in U.S. Pat. No. 4,547,692 to Spaulding. In Spaulding, a braking capacitor is connected in series with a resistor and a diode. The braking capacitor may also be connected in parallel across a winding in the motor. During motor operation, the capacitor is charged by current flowing through the resistor and diode. When the brake is to be applied, the capacitor is directly connected in parallel with the windings of the motor. The charge stored in the braking capacitor therefore discharges through the motor windings, rapidly braking the motor.

While the braking systems disclosed in Snyder and Spaulding are effective at braking AC motors, the systems exhibit some undesirable characteristics during operation. For example, in Snyder and Spaulding an alternating current is continuously applied through a resistor prior to rectification and application to the braking capacitor. The constant application of AC to the resistor decreases the power efficiency of the circuit and generates heat. A resistor with a higher power rating must therefore be selected, increasing the size and cost of the brake circuit.

It will therefore be recognized that it would be advantageous to develop a braking circuit wherein the AC line voltage is not continuously applied through a resistive component of the circuit. At the same time, it would be desirable to reduce the number of components within the braking circuit in order to minimize the size and cost of the circuit.

SUMMARY OF THE INVENTION

The present invention is a low cost brake circuit for an alternating current (AC) motor. The brake circuit includes a rectifier connected in series with a braking capacitor, and a shunt regulator that is connected in parallel with the braking capacitor. When an AC voltage is applied across the brake circuit, a rectified current begins to charge the braking capacitor. The size of the braking capacitor is selected so that, when fully charged, it is capable of storing sufficient energy to brake the AC motor and any connected device when the power is removed. The rectified current charges the braking capacitor to a preselected voltage in a desired amount of time. When the AC voltage is removed, the braking capacitor is connected across the windings of the motor. The energy stored in the braking capacitor is thereby discharged as a direct current into the motor windings in order to bring the motor to a rapid halt.

In accordance with one aspect of the invention, the preselected voltage to which the capacitor is charged is limited by the shunt regulator. When the preselected voltage is reached, the shunt regulator is biased into conduction, providing a low resistance path to ground. The rectified charging current therefore flows through the shunt regulator to ground rather than continuing to charge the braking capacitor.

In accordance with another aspect of the invention, the rectifier is a silicon controlled rectifier (SCR). When the braking capacitor has charged to the preselected voltage, the SCR is biased off to halt current flow to the shunt regulator and to the braking capacitor. If the voltage across the capacitor drops, the SCR is biased on, allowing the capacitor to recharge to the preselected level. The SCR therefore acts as a limit switch to prevent the constant application of a charging voltage to the braking capacitor. The use of an SCR as a limit switch reduces the amount of power that is consumed by the circuit during operation.

A significant advantage of the invention is that by halting application of the charging voltage to the braking capacitor when the capacitor is charged, the amount of heat that is generated while the motor is running is minimized. This allows the AC motor to run for extended periods of time without fear of undue heat buildup from the braking circuit. Additionally, the use of a minimum number of components allows the brake to be incorporated into low cost and low power AC motors where the brake may replace more expensive mechanical braking methods. Finally, since the voltage across the capacitor is limited to a preselected value, the amount of direct current that is applied to brake the AC motor is limited to a level that will not harm the motor winding.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
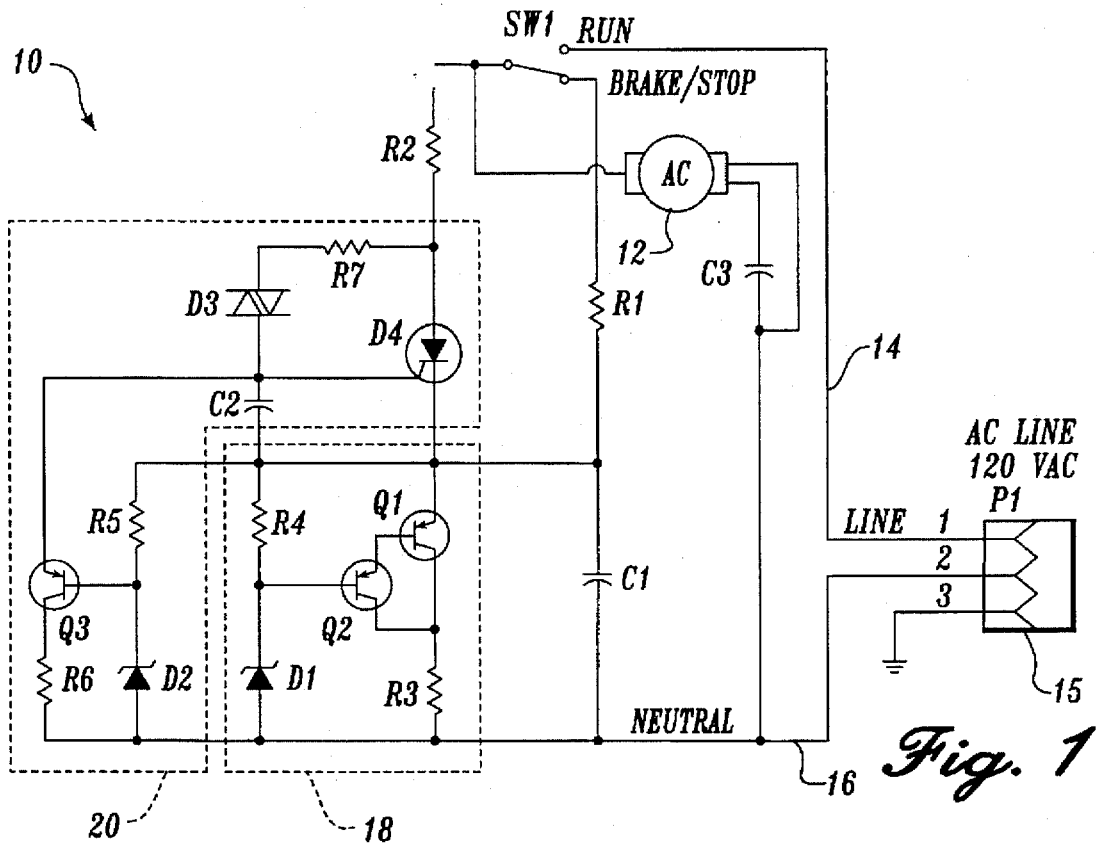
FIG. 1 is a schematic of a preferred embodiment of a braking circuit for an alternating current (AC) inductive motor of the present invention.

FIG. 1 depicts a preferred embodiment of a brake circuit 10 of the present invention connected to an alternating current (AC) motor 12. At the heart of the brake circuit is a braking capacitor C1. Braking capacitor C1 is charged to a preselected voltage and maintained at that voltage until it is desired to stop the motor. To stop the motor, the braking capacitor is switched across the windings of the motor so that the charge stored in the capacitor is applied to the motor's windings as direct current (DC). The application of direct current to the motor quickly brings the motor's rotor to a halt. Preferably, the value of capacitor C1 is selected to ensure that when fully charged, the capacitor will contain sufficient charge to stop the motor within a desired period of time.

Braking capacitor C1 is charged to a preselected voltage when the motor is initially turned on. From a "Brake/Stop" position, a switch S1 is switched to a "Run" position where an AC line voltage present on lines 14 and 16 is applied to motor 12. The AC line voltage is provided by an AC source, in this case a standard wall outlet accessed by a plug 15. Preferably, motor 12 is a synchronous motor used in light industrial or commercial applications, for example, model FM-PSC manufactured by Reliance Electric. The AC motor contains a starting winding and a running winding. The starting winding has a capacitor C3 in series with the winding to shift the phase of the applied current voltage, generating a starting torque in the motor to begin spinning the rotor in the correct direction. When the rotor reaches a desired operating speed, the majority of the motive force is provided by the running winding. It will be appreciated that while it is contemplated using brake 10 with a single-phase synchronous motor, the brake is suitable for use with other AC motors as well.

When the motor is switched on, the braking capacitor in the brake circuit simultaneously begins to charge. As shown in FIG. 1, the brake circuit comprises a braking capacitor C1, a shunt regulator 18, a limit circuit 20, and resistors R1 and R2. During charging, current flows from the AC source through resistor R2 and is applied to the anode of a silicon controlled rectifier (SCR) D4. The AC line voltage is also applied to the gate of SCR D4 through the series combination of a resistor R7 and a diac D3. When the line voltage is positive, SCR D4 is biased into conduction by the positive voltage applied to the gate of the SCR. When the SCR has been biased on, current flows through the SCR and begins to charge capacitor C1. When the line voltage is negative, SCR D4 will not conduct due to the negative voltage applied to the gate of the SCR. During the negative phase of the line voltage, the charge in braking capacitor C1 is therefore retained. It will be appreciated that diac D3 is provided to ensure that the SCR is fired "hard" and switched to a conducting state when the AC line voltage transitions from a negative to a positive phase. Resistor R7 acts as a pull-up resistor to ensure that the appropriate voltage is applied to the gate of the SCR.

During each positive phase of the AC line voltage, the braking capacitor C1 is incrementally charged. Shunt regulator 18 is provided to ensure that braking capacitor C1 does not charge beyond a preselected level. The shunt regulator comprises two PNP transistors Q1 and Q2 that are connected in a Darlington configuration. That is, the emitter of transistor Q1 is connected to a positive lead of capacitor C1, and the collector of transistor Q1 is connected through a resistor R3 to ground. The emitter of transistor Q2 is connected to the base of transistor Q1, and the collector of transistor Q2 is connected to the collector of transistor Q1. The base of transistor Q2 is connected by a Zener diode D1 to ground, and by a resistor R4 to the emitter of transistor Q1. For purposes of this application, ground will refer to the neutral line 16 of the plug 15.

The breakdown voltage of Zener diode D1 in the shunt regulator selects the preselected voltage to which the braking capacitor C1 is charged. The shunt regulator allows the capacitor to charge to within approximately 1.5 volts (or the sum of the $V_{BE}$ voltage of transistors Q1 and Q2) of the breakdown voltage of the Zener diode. When the capacitor reaches that voltage, the voltage drop at the base of transistor Q2 is sufficient to drive the Zener diode D1 into breakdown operation and bias transistors Q1 and Q2 into conduction. Further charging current received through SCR D4 is therefore shunted away from capacitor C1 and through transistor Q1 to ground. In an actual embodiment of the invention, the Zener diode D1 is selected to have a 27 volt, 1 watt rating. The braking capacitor will therefore charge to approximately 25.5 volts.

The size of braking capacitor C1 is selected so that the capacitor will store sufficient charge to bring the AC motor to a rapid halt when connected across the windings of the motor. The size of the capacitor dictates the amount of charge that can be stored in the capacitor when the voltage in the capacitor is at a desired level. In an actual embodiment of the invention, braking capacitor C1 is a 10,000 µF capacitor that is charged to approximately 25.5 volts. The length of time it takes to reach the preselected voltage across the capacitor is dependent upon a time constant dictated by resistor R2 and capacitor C1. The time constant of the brake circuit must be selected so that the capacitor will charge to the preselected voltage level in a period less than minimum period of the time before the brake must be applied to stop the AC motor. That is, the braking capacitor must have sufficient charge to stop the motor within the shortest period of time expected for the motor to be stopped after the motor has been started. In an actual embodiment of the brake circuit, the braking capacitor C1 is charged to the preselected level in approximately 40 to 45 AC line cycles, or approximately three-quarters of a second after the motor has been turned on. To charge within that desired period of time, resistor R2 preferably has a value of 100 ohms.

To ensure that current is not continuously carried by resistor R2, limit circuit 20 ceases conducting current when the preselected voltage level is measured across the braking capacitor. Limit circuit 20 includes an NPN transistor Q3 having an emitter connected to the gate of SCR D4, and a collector tied to ground through a resistor R6. The base of transistor Q3 is connected to ground through a Zener diode D2, and to the positive lead of the braking capacitor through a resistor R5. A capacitor C2 is also provided between the emitter of transistor Q3 and the positive lead of the braking capacitor. Diac D3, resistor R7, and SCR D4 are also contained in the limit circuit as previously described.

The breakdown voltage of Zener diode D2 dictates when the limit circuit is turned on. When the voltage across braking capacitor C1 reaches the preselected voltage, the voltage across Zener diode D2 is sufficient to drive the diode into breakdown operation. When this occurs, the voltage of the base of transistor Q3 is sufficient to bias the transistor on. In this mode, SCR D4 is prevented from turning on because the gate of the SCR is now held near ground. As a result, SCR D4 no longer conducts during the positive phase of the AC line voltage. Once the voltage across braking capacitor C1 therefore reaches the preselected level, the limit circuit ensures that additional charging current is not applied to the capacitor. Capacitor C1 is therefore not constantly being recharged during each positive phase of the AC line voltage. It will be appreciated that a capacitor C2 is provided between the gate of SCR D4 and the positive lead of the braking capacitor C1 to reduce noise in the limit circuit.

Although both the shunt regulator 18 and the limit circuit 20 prevent overcharging of the capacitor, the circuits are not redundant. The switching of the limit circuit only occurs during the transition from the negative to the positive phase of the AC line voltage. Because an SCR will remain in a conducting state until a reverse voltage is applied across the gate of the SCR, during the positive phase of the AC line voltage the SCR will remain in the conducting state regardless of whether the voltage across braking capacitor C1 exceeds the preselected voltage. If the voltage across the braking capacitor reaches the preselected level during a positive phase, the capacitor might therefore be overcharged. During the remaining portion of the positive phase in which the SCR is conducting, the shunt regulator therefore diverts the charging current to ground. Once the braking capacitor has reached the preselected voltage, on the next positive phase of the AC line voltage the limit circuit switches to ensure that current is no longer conducted to the capacitor. The shunt regulator and the limit circuit therefore cooperate to ensure that the braking capacitor is not overcharged.

To prevent oscillation between the limit circuit and the shunt regulator, the voltage necessary to turn on the shunt regulator is selected to be slightly above the voltage necessary to turn on the limit circuit. The braking capacitor will therefore charge above the level necessary to turn on the limit circuit. Oscillation is prevented because the slow decay of the voltage across the braking capacitor will not immediately cause the limit circuit to turn back on. To ensure turn on at different levels, preferably the Zener diode in the limit circuit is selected to have a breakdown voltage that is several volts less than the Zener diode in the shunt regulator. In an actual embodiment of the invention, Zener diode D2 is selected to have a breakdown voltage of 24 volts, and Zener diode D1 is selected to have a breakdown voltage of 27 volts.

An advantage of including a limit circuit to turn off current flow to the braking capacitor is that the power efficiency of the braking circuit is improved. For example, if current would be allowed to constantly flow through resistor R2, the resistor would heat and dissipate power. Heating the resistor not only wastes energy, but stresses the resistor and the surrounding circuit due to the generated heat. In the preferred embodiment of the brake circuit, the limit switch halts current flow after the capacitor has charged to the desired level. Current is therefore not constantly flowing through resistor R2, allowing resistor R2 to have a reduced power rating. The size of the brake circuit is therefore also minimized.

Once the voltage across the braking capacitor C1 reaches the preselected level, the brake is in a state of readiness to stop the AC motor. To brake the motor, switch SW1 is switched from the Run position to the Brake/Stop position. In the Brake/Stop position, the positive end of braking capacitor C1 is connected in series with resistor R1 and the AC motor windings. Resistor R1 is provided to prevent damage to the shunt regulator. Immediately after removing power from the AC motor, the AC motor will generate a voltage that is applied across the brake circuit. The induced voltage must be reduced so that it does not damage the transistors within the shunt regulator. To dissipate a portion of the energy, resistor R1 is therefore provided in series with the braking capacitor.

The charge contained within braking capacitor C1 is applied to the windings of the motor to brake the motor. The time it takes to stop the motor depends on the size of the braking capacitor, the amount of charge that the capacitor contains, the inertia of the motor rotor, and the inertia of any device connected to the motor. In an actual embodiment of the invention, the AC motor was stopped within one full rotation of the rotor.

In situations where the motor operates for extended periods of time without being shut off, the voltage across braking capacitor C1 may begin to decay. If the voltage across the braking capacitor drops sufficiently, limit circuit 20 will turn on during the positive phases of the AC line voltage to allow capacitor C1 to recharge to the preselected level. As discussed above, the appropriate selection of breakdown voltages of Zener diodes D1 and D2 ensures that the limit circuit does not rapidly cycle on and off.

In an actual embodiment of the invention, the components within the AC motor brake have the following values:

| Component | Value |
| --- | --- |
| Resistor R1 | 5 ohms |
| Resistor R2 | 100 ohms, 10 watts |
| Resistor R3 | 10 ohms |
| Resistor R4 | 150 ohms |
| Resistor R5 | 75 ohms |
| Resistor R6 | 1K ohms |
| Resistor R7 | 10K ohms |
| Capacitor C1 | 10,000 µF |
| Capacitor C2 | 0.1 µF |
| Capacitor C3 | 12.5 µF |
| Diode D1 | 27 volts, 1 watt |
| Diode D2 | 24 volts, 1 watt |
| Diode D3 | HT-32 |
| SCR D4 | S4008 |
| Transistor Q1 | TIP 42C |
| Transistor Q2 | 2N3906 |
| Transistor Q3 | 2N3906 |

Several advantages arise from the disclosed AC motor brake construction. The brake is inexpensive and can be produced economically for light industrial applications. Further, by appropriate selection of component values for resistor R2 and braking capacitor C1, the time constant may be selected to allow the brake to rapidly cycle on and off. In an actual embodiment of the invention, the AC brake was cycled on and off to repeatedly stop a motor once per second. Moreover, because current does not constantly flow through resistor R2, the size and cost of the resistor is minimized.

Figure 2:
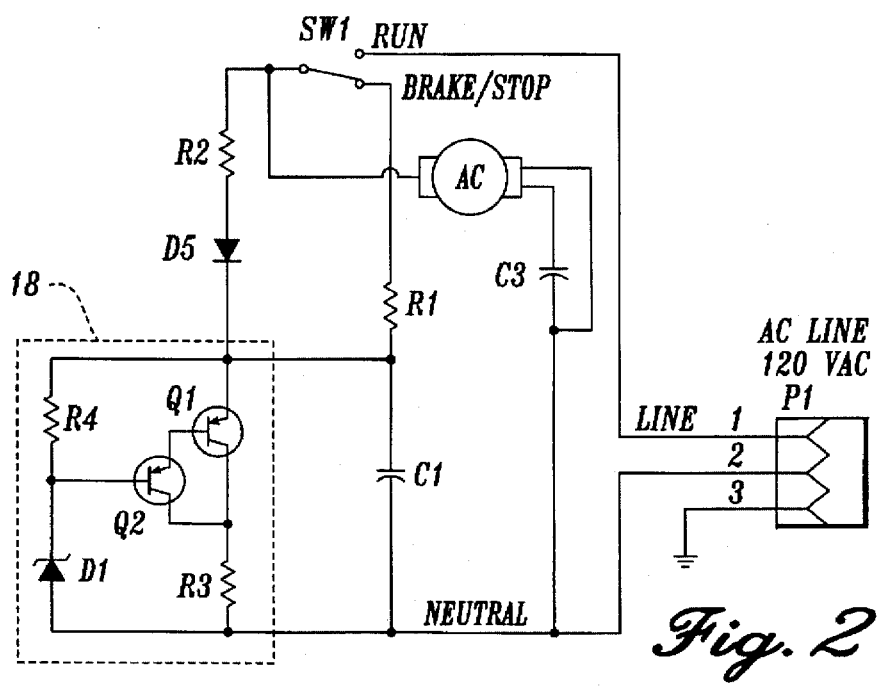
FIG. 2 is a schematic of a second embodiment of a braking circuit for an AC inductive motor.

While the preferred embodiment of the invention has been illustrated and described, it will be appreciated that various changes can be made therein without departing from the spirit and scope of the invention. For example, as shown in FIG. 2, the limit circuit may be replaced with a diode D5 that is in series between resistor R2 and braking capacitor C1. The diode functions similarly to the SCR D4 in the preferred embodiment of the circuit. That is, during each positive phase of the AC line voltage, the capacitor C1 is incrementally charged. When the capacitor reaches the preselected voltage, shunt regulator 18 shunts the remaining current to ground. Instead of switching off current flow like the limit circuit, however, diode D5 continues to conduct during all positive phases of the AC line voltage. Thus, current continues to flow through resistor R2, resulting in the dissipation of energy in the form of heat as long as the motor remains in operation. In environments where the motor is running for substantial periods of time without stopping, this causes tremendous inefficiency. In environments where the AC motor is rapidly turned on and off, however, the use of a diode D5 may provide a more economical solution to implement a simple AC motor brake. In the embodiment shown in FIG. 2, resistor R2 preferably has a 20 watt rating to dissipate the additional power.

Similarly, it will be appreciated that in the preferred embodiment of the invention, diac D3 may be removed from the braking circuit. The hard firing caused by diac D3 ensures that the SCR is switched on during each positive phase of the AC line voltage. Removing diac D3 reduces the reliability of the motor brake, as the SCR may not be turned on to conduct during all positive phases of the AC line voltage. Although conduction is not always achieved, the braking capacitor will charge sufficiently when the motor is operating for extended periods of time. Consequently, within the scope of the appended claims, it will be appreciated that the invention can be practiced other than as specifically described herein.

The embodiments of the invention in which an exclusive property or privilege is claimed are defined as follows:

1. An electric brake for an alternating current (AC) motor having at least one winding, the electric brake comprising:
   (a) a capacitor;
   (b) rectifying means coupled to the capacitor, the rectifying means rectifying an AC voltage to produce a charging current that is applied to the capacitor causing the capacitor to charge;
   (c) a switch coupled to the capacitor, the switch switching between a first position wherein an AC voltage is applied to the AC motor to cause it to run and the capacitor is charged by the charging current and a second position wherein the capacitor is connected to the winding of the AC motor, the capacitor discharging through the winding of the AC motor to brake the AC motor when the switch is in the second position; and
   (d) shunting means coupled to the capacitor, the shunting means shunting the charging current away from the capacitor when a voltage across the capacitor has reached a predetermined voltage while the switch coupled to the capacitor is in the first position.

2. The electric brake of claim 1, wherein the rectifying means is a diode.

3. The electric brake of claim 1, wherein the rectifying means comprises a silicon controlled rectifier (SCR).

4. The electric brake of claim 3, wherein the SCR may be biased in a first state, wherein the SCR rectifies the AC voltage, and a second state, wherein the SCR does not rectify the AC voltage.

5. The electric brake of claim 4, wherein the SCR is biased in the first state when the voltage across the capacitor is less than the preselected voltage and the second state when the voltage across the capacitor is greater than or equal to the preselected voltage.

6. The electric brake of claim 1, wherein the shunting means is a shunt regulator.

7. The electric brake of claim 6, wherein the shunt regulator comprises:
   (a) a first transistor having a base, a collector, and an emitter, wherein the emitter is connected to a first lead of the capacitor and the collector is connected to a second lead of the capacitor through a first resistor;
   (b) a second transistor having a base, a collector, and an emitter, wherein the emitter is connected to the base of the first transistor and the collector is connected to the collector of the first transistor;
   (c) a Zener diode connected between the base of the second transistor and the second lead of the capacitor; and
   (d) a second resistor connected between the base of the second transistor and the first lead of the capacitor.

8. An electric brake for an alternating current (AC) motor having at least one winding, the electric brake comprising:
   (a) storage means for storing electrical energy;
   (b) a switch coupled to the storage means, the switch having a first position for coupling the storage means to a charging source and applying an AC voltage to the AC motor to cause it to run, the switch having a second position for coupling the storage means to a winding of the AC motor, the storage means charging on a current received from the charging source when the switch is in the first position and the storage means is connected to the charging source, and discharging when the switch is in the second position and the storage means is connected to the winding of the AC motor so as to brake the AC motor; and
   (c) a shunt regulator, the shunt regulator coupled to the storage memos for shunting the current away from the storage means when a voltage across the storage means reaches a preselected voltage while the storage means is connected to the charging source and the AC motor is running.

9. The electric brake of claim 8, further comprising a limit circuit connected between the charging source and the storage means, the limit circuit selectively coupling the storage means to the charging source when the voltage across the storage means is less than the preselected voltage, and decoupling the storage means from the charging source when the voltage across the storage means is equal to or greater than the preselected voltage.

10. The electric brake of claim 9, wherein the limit circuit comprises a silicon controlled rectifier (SCR).

11. The electric brake of claim 10, wherein the SCR may be biased in a first state, wherein charging current is applied to the storage means, and a second state, wherein charging current is not applied to the storage means.

12. The electric brake of claim 11, wherein the SCR is biased in the first state when the voltage across the storage means is less than the preselected voltage and the second state when the voltage across the storage means is greater than or equal to the preselected voltage.

13. The electric brake of claim 8, wherein the storage means is a capacitor.

14. The electric brake of claim 13, wherein the shunt regulator comprises:

(a) a first transistor having a base, a collector, and an emitter, wherein the emitter is connected to a first lead of the capacitor and the collector is connected to a second lead of the capacitor through a first resistor;

(b) a second transistor having a base, a collector, and an emitter, wherein the emitter is connected to the base of the first transistor and the collector is connected to the collector of the first transistor;

(c) a Zener diode connected between the base of the second transistor and the second lead of the capacitor; and (d) a second resistor connected between the base of the second transistor and the first lead of the capacitor.

15. A method of braking an alternating current AC motor having at least one winding, the method comprising:

(a) rectifying an alternating current to produce a charging current;

(b) applying the charging current to a capacitor during operation of the AC motor to charge the capacitor to a preselected voltage;

(c) shunting the charging current away from the capacitor after a voltage measured across the capacitor has reached the preselected voltage while an AC voltage is being applied to the AC motor to cause it to run; and (d) applying the capacitor across the winding of the AC motor to brake the motor.

16. The method of claim 15, further comprising the step of ceasing to rectify the alternating current to produce the charging current when the voltage measured across the capacitor has reached the preselected voltage.

17. The method of claim 16, further comprising the step of continuing to rectify the alternating current to produce the charging current if the voltage measured across the capacitor falls below the preselected voltage.

18. An electric brake for an alternating current (AC) motor having at least one winding, the electric brake comprising:

(a) a storage means for storing electrical energy;

(b) a switch coupled to the storage means, the switch having a first position for coupling the storage means to a charging source while an AC voltage is applied to the AC motor to cause it to run, and a second position for coupling the storage means to a winding of the AC motor, the storage means being charged by a current supplied by the charging source when the switch is in the first position to connect the storage means to the charging source, and being discharged through the winding of the AC motor when the switch is in the second position to brake the AC motor; and (c) a limit circuit defining a circuit path for the current supplied by the charging source to the storage means, the limit circuit allowing current to flow from the charging source to the storage means when the voltage across the storage means is less than the preselected voltage and preventing current from flowing from the charging source to the storage means when the voltage across the storage means is equal to or greater than the preselected voltage.

19. The electric brake of claim 18, wherein the circuit path of the limit circuit includes a silicon controlled rectifier (SCR).

20. The electric brake of claim 19, wherein the limit circuit includes means for selectively biasing the SCR in a first state, wherein charging current is allowed to flow to the storage means, and a second state, wherein charging current is prevented from flowing to the storage means.

21. The electric brake of claim 20, wherein the SCR is biased in the first state when the voltage across the storage means is less than the preselected voltage and the second state when the voltage across the storage means is greater than or equal to the preselected voltage.

* * * * *